US010200651B2

(12) United States Patent
Hines et al.

(10) Patent No.: US 10,200,651 B2
(45) Date of Patent: *Feb. 5, 2019

(54) APPARATUS AND METHOD FOR PRESENTING MEDIA CONTENT WITH TELEPRESENCE

(71) Applicant: AT&T INTELLECTUAL PROPERTY I, L.P., Atlanta, GA (US)

(72) Inventors: Tara Hines, New York, NY (US); Andrea Basso, Turin (IT); Aleksey Ivanov, Middletown, NJ (US); Jeffrey Mikan, Atlanta, GA (US); Nadia Morris, Sunnyvale, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/227,610

(22) Filed: Aug. 3, 2016

(65) Prior Publication Data

US 2016/0344976 A1    Nov. 24, 2016

Related U.S. Application Data

(63) Continuation of application No. 13/168,539, filed on Jun. 24, 2011, now Pat. No. 9,445,046.

(51) Int. Cl.
*H04N 7/14* (2006.01)
*H04N 13/194* (2018.01)
(Continued)

(52) U.S. Cl.
CPC ........... *H04N 7/147* (2013.01); *H04L 65/403* (2013.01); *H04L 65/4076* (2013.01);
(Continued)

(58) Field of Classification Search
CPC .. H04N 7/147; H04N 13/194; H04N 21/8146; H04N 21/42203; H04N 7/157;
(Continued)

(56) References Cited

U.S. PATENT DOCUMENTS

| 2,832,821 A | 4/1958 | Du Mont |
| 4,649,425 A | 3/1987 | Pund |

(Continued)

OTHER PUBLICATIONS

Edwards, "Active Shutter 3D Technology for HDTV", PhysOrg.com; 12 pages; Sep. 25, 2009; http://www.physorg.com/news173082582.html; web site last visited May 10, 2010.

*Primary Examiner* — Oyesola C Ojo
(74) *Attorney, Agent, or Firm* — Guntin & Gust, PLC; Mark Wilinski

(57) ABSTRACT

A system that incorporates teachings of the present disclosure may capture images using a camera system at a location associated with a user, transmit video content representative of the images over a network for presentation by another media processor at another location, receive at a media processor media content and second video content representative of second images that are associated with the second user, and present at a display device of the location the media content and the second video content in a telepresence configuration that simulates a presence of the other user at the location, where at least one of the media content and the video content is presented as three dimensional content. Other embodiments are disclosed.

20 Claims, 7 Drawing Sheets

(51) Int. Cl.
  *H04N 7/15* (2006.01)
  *H04N 21/422* (2011.01)
  *H04N 21/4223* (2011.01)
  *H04N 21/431* (2011.01)
  *H04N 21/4788* (2011.01)
  *H04L 29/06* (2006.01)
  *H04N 21/81* (2011.01)

(52) U.S. Cl.
  CPC .......... *H04L 65/605* (2013.01); *H04N 7/157* (2013.01); *H04N 13/194* (2018.05); *H04N 21/4223* (2013.01); *H04N 21/42203* (2013.01); *H04N 21/4312* (2013.01); *H04N 21/4788* (2013.01); *H04N 21/8146* (2013.01)

(58) Field of Classification Search
  CPC .......... H04N 21/4312; H04N 21/4788; H04N 21/4223; H04L 65/403; H04L 65/605; H04L 65/4076
  USPC ........................................ 348/14.07
  See application file for complete search history.

(56) References Cited

U.S. PATENT DOCUMENTS

| | | | |
|---|---|---|---|
| 5,012,351 A | 4/1991 | Isono | |
| 5,293,529 A | 3/1994 | Yoshimura et al. | |
| 5,353,269 A | 10/1994 | Kobayashi et al. | |
| 5,392,266 A | 2/1995 | Kobayashi et al. | |
| 5,465,175 A | 11/1995 | Woodgate | |
| 6,014,164 A | 1/2000 | Woodgate | |
| 6,115,177 A | 9/2000 | Vossler | |
| 6,144,375 A | 11/2000 | Jain et al. | |
| 6,188,442 B1 | 2/2001 | Narayanaswami | |
| 6,243,054 B1 | 6/2001 | DeLuca | |
| 6,285,368 B1 | 9/2001 | Sudo | |
| 6,535,241 B1 | 3/2003 | McDowall | |
| 6,559,813 B1 | 5/2003 | DeLuca | |
| 6,654,721 B2 | 11/2003 | Handelman | |
| 6,725,463 B1 | 4/2004 | Birleson | |
| 6,859,549 B1 | 2/2005 | Oliensis | |
| 6,924,833 B1 | 8/2005 | McDowall | |
| 6,965,381 B2 | 11/2005 | Kitamura | |
| 7,106,358 B2 | 9/2006 | Valliath et al. | |
| 7,137,558 B2 | 11/2006 | Aigeldinger et al. | |
| 7,204,592 B2 | 4/2007 | O'Donnell | |
| 7,245,430 B2 | 7/2007 | Kobayashi et al. | |
| 7,327,410 B2 | 2/2008 | Cho et al. | |
| 7,391,443 B2 | 6/2008 | Kojima et al. | |
| 7,613,927 B2 | 11/2009 | Holovacs | |
| 7,785,201 B2 | 8/2010 | Hashimoto | |
| 7,813,543 B2 | 10/2010 | Modén | |
| 8,111,282 B2 | 2/2012 | Cutler et al. | |
| 8,117,281 B2 | 2/2012 | Robinson et al. | |
| 8,130,256 B2* | 3/2012 | Trachtenberg ......... | H04N 7/152 348/14.08 |
| 8,254,668 B2 | 8/2012 | Mashitani | |
| 8,284,230 B2* | 10/2012 | Jeong ................... | G01S 3/7864 348/14.01 |
| 8,305,914 B2 | 11/2012 | Thielman et al. | |
| 8,370,873 B2 | 2/2013 | Shintani | |
| 8,373,744 B2 | 2/2013 | Akka et al. | |
| 8,416,278 B2 | 4/2013 | Kim et al. | |
| 8,436,888 B1 | 5/2013 | Baldino et al. | |
| 8,438,502 B2 | 5/2013 | Friedman et al. | |
| 8,456,507 B1 | 6/2013 | Mallappa et al. | |
| 8,471,888 B2* | 6/2013 | George ................. | G06F 1/3203 348/14.02 |
| 8,552,983 B2 | 10/2013 | Chiu | |
| 8,625,769 B1* | 1/2014 | Allen .................... | G06F 3/0486 348/14.08 |
| 8,644,467 B2 | 2/2014 | Catchpole et al. | |
| 8,675,067 B2* | 3/2014 | Chou ................... | H04L 12/1827 348/14.08 |
| 8,687,042 B2 | 4/2014 | Seshadri et al. | |
| 9,032,470 B2 | 5/2015 | Bedingfield, Sr. et al. | |
| 9,049,033 B2 | 6/2015 | Lemmey et al. | |
| 9,077,846 B2 | 7/2015 | Pradeep | |
| 9,325,943 B2 | 4/2016 | Wilson et al. | |
| 9,379,900 B2 | 6/2016 | Lemmey | |
| 9,830,680 B2 | 11/2017 | Meuninck et al. | |
| 2002/0009137 A1 | 1/2002 | Nelson | |
| 2002/0114072 A1 | 8/2002 | Hong et al. | |
| 2002/0122145 A1 | 9/2002 | Tung | |
| 2002/0122585 A1 | 9/2002 | Swift et al. | |
| 2003/0043262 A1 | 3/2003 | Takemoto | |
| 2003/0090592 A1 | 5/2003 | Callway et al. | |
| 2003/0128273 A1 | 7/2003 | Matsui | |
| 2003/0128871 A1 | 7/2003 | Naske et al. | |
| 2003/0132951 A1 | 7/2003 | Sorokin et al. | |
| 2003/0214630 A1 | 11/2003 | Winterbotham | |
| 2003/0223499 A1 | 12/2003 | Routhier et al. | |
| 2003/0231179 A1* | 12/2003 | Suzuki .................... | G06T 17/10 345/423 |
| 2004/0013252 A1 | 1/2004 | Craner et al. | |
| 2004/0027452 A1 | 2/2004 | Yun | |
| 2004/0104864 A1 | 6/2004 | Nakada | |
| 2004/0109093 A1 | 6/2004 | Small-Stryker | |
| 2004/0130614 A1* | 7/2004 | Valliath ................. | H04N 7/147 348/14.01 |
| 2004/0150585 A1 | 8/2004 | Tomisawa et al. | |
| 2004/0164154 A1 | 8/2004 | Aigeldinger et al. | |
| 2004/0218104 A1 | 11/2004 | Smith | |
| 2004/0233275 A1 | 11/2004 | Tomita et al. | |
| 2005/0041736 A1 | 2/2005 | Butler-Smith et al. | |
| 2005/0057702 A1 | 3/2005 | Cho et al. | |
| 2005/0066165 A1 | 3/2005 | Peled et al. | |
| 2005/0084006 A1 | 4/2005 | Lei | |
| 2005/0123171 A1 | 6/2005 | Kobayashi et al. | |
| 2005/0169553 A1 | 8/2005 | Maurer | |
| 2005/0185711 A1 | 8/2005 | Pfister | |
| 2005/0190180 A1 | 9/2005 | Jin et al. | |
| 2005/0270367 A1 | 12/2005 | McDowall | |
| 2006/0001596 A1 | 1/2006 | Cuffaro et al. | |
| 2006/0046846 A1 | 3/2006 | Hashimoto | |
| 2006/0109200 A1 | 5/2006 | Alden | |
| 2006/0136846 A1 | 6/2006 | Im et al. | |
| 2006/0139312 A1 | 6/2006 | Sinclair et al. | |
| 2006/0161410 A1 | 7/2006 | Hamatani et al. | |
| 2006/0200518 A1 | 9/2006 | Sinclair et al. | |
| 2006/0203085 A1 | 9/2006 | Tomita | |
| 2006/0252978 A1 | 11/2006 | Vesely | |
| 2006/0274197 A1 | 12/2006 | Yoo | |
| 2007/0039032 A1 | 2/2007 | Goldey et al. | |
| 2007/0052672 A1 | 3/2007 | Ritter et al. | |
| 2007/0153122 A1 | 7/2007 | Ayite | |
| 2007/0171275 A1 | 7/2007 | Kenoyer | |
| 2007/0242068 A1 | 10/2007 | Han | |
| 2007/0250567 A1* | 10/2007 | Graham ................. | H04L 12/18 709/204 |
| 2007/0263003 A1 | 11/2007 | Ko | |
| 2007/0266412 A1 | 11/2007 | Trowbridge | |
| 2007/0296721 A1 | 12/2007 | Chang et al. | |
| 2008/0015997 A1 | 1/2008 | Moroney et al. | |
| 2008/0024454 A1 | 1/2008 | Everest | |
| 2008/0044079 A1 | 2/2008 | Chao et al. | |
| 2008/0052759 A1 | 2/2008 | Kronlund et al. | |
| 2008/0062125 A1 | 3/2008 | Kitaura | |
| 2008/0080852 A1 | 4/2008 | Chen | |
| 2008/0100547 A1 | 5/2008 | Cernasov | |
| 2008/0151092 A1 | 6/2008 | Vilcovsky et al. | |
| 2008/0199070 A1 | 8/2008 | Kim et al. | |
| 2008/0247610 A1 | 10/2008 | Tsunoda | |
| 2008/0247670 A1 | 10/2008 | Tam et al. | |
| 2008/0256572 A1 | 10/2008 | Chen | |
| 2008/0303895 A1 | 12/2008 | Akka et al. | |
| 2008/0303896 A1 | 12/2008 | Lipton et al. | |
| 2008/0310499 A1 | 12/2008 | Kim | |
| 2009/0033737 A1 | 2/2009 | Goose et al. | |
| 2009/0046895 A1 | 2/2009 | Pettersson et al. | |
| 2009/0096858 A1 | 4/2009 | Jeong et al. | |
| 2009/0097771 A1 | 4/2009 | Jiang et al. | |
| 2009/0100474 A1 | 4/2009 | Migos | |

(56) References Cited

U.S. PATENT DOCUMENTS

| | | |
|---|---|---|
| 2009/0122134 A1 | 5/2009 | Joung et al. |
| 2009/0128620 A1 | 5/2009 | Lipton et al. |
| 2009/0160934 A1 | 6/2009 | Hendrickson et al. |
| 2009/0174708 A1 | 7/2009 | Yoda et al. |
| 2009/0221368 A1 | 9/2009 | Yen et al. |
| 2009/0278917 A1* | 11/2009 | Dobbins .............. G06F 3/011 348/53 |
| 2009/0304265 A1 | 12/2009 | Khan et al. |
| 2009/0310851 A1 | 12/2009 | Arcas et al. |
| 2009/0315977 A1 | 12/2009 | Jung |
| 2009/0319178 A1 | 12/2009 | Khosravy |
| 2009/0327418 A1 | 12/2009 | Zhang et al. |
| 2010/0007582 A1 | 1/2010 | Zalewski et al. |
| 2010/0013738 A1 | 1/2010 | Covannon |
| 2010/0026783 A1 | 2/2010 | Chiu et al. |
| 2010/0026809 A1 | 2/2010 | Curry et al. |
| 2010/0031202 A1 | 2/2010 | Morris et al. |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073454 A1* | 3/2010 | Lovhaugen .......... G06F 3/0486 348/14.03 |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085416 A1 | 4/2010 | Hegde et al. |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0103822 A1 | 4/2010 | Montwill et al. |
| 2010/0114783 A1 | 5/2010 | Spolar |
| 2010/0134411 A1 | 6/2010 | Tsumura |
| 2010/0150523 A1 | 6/2010 | Okubo |
| 2010/0171697 A1 | 7/2010 | Son et al. |
| 2010/0171814 A1 | 7/2010 | Routhier et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0212509 A1 | 8/2010 | Tien et al. |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0228825 A1* | 9/2010 | Hegde .............. G06F 21/6218 709/204 |
| 2010/0235871 A1 | 9/2010 | Kossin |
| 2010/0238273 A1 | 9/2010 | Luisi et al. |
| 2010/0241999 A1 | 9/2010 | Russ et al. |
| 2010/0250120 A1 | 9/2010 | Waupotitsch et al. |
| 2010/0303442 A1 | 12/2010 | Newton et al. |
| 2010/0306800 A1 | 12/2010 | Jung et al. |
| 2010/0309287 A1 | 12/2010 | Rodriguez |
| 2010/0315494 A1 | 12/2010 | Ha et al. |
| 2010/0328475 A1 | 12/2010 | Thomas et al. |
| 2011/0001806 A1 | 1/2011 | Nakahata |
| 2011/0012896 A1 | 1/2011 | Ji |
| 2011/0012992 A1 | 1/2011 | Luthra |
| 2011/0019669 A1 | 1/2011 | Ma et al. |
| 2011/0029893 A1 | 2/2011 | Roberts et al. |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0081023 A1 | 4/2011 | Raghuvanshi et al. |
| 2011/0085017 A1 | 4/2011 | Robinson et al. |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn |
| 2011/0122220 A1 | 5/2011 | Roberts et al. |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1 | 7/2011 | Fortin et al. |
| 2011/0164111 A1 | 7/2011 | Karaoguz et al. |
| 2011/0164122 A1 | 7/2011 | Hardacker |
| 2011/0169913 A1 | 7/2011 | Karaoguz et al. |
| 2011/0187821 A1 | 8/2011 | Routhier et al. |
| 2011/0193946 A1 | 8/2011 | Apitz |
| 2011/0199460 A1 | 8/2011 | Gallagher |
| 2011/0199469 A1 | 8/2011 | Gallagher |
| 2011/0211049 A1 | 9/2011 | Bassali et al. |
| 2011/0216153 A1* | 9/2011 | Tasker ................. H04N 7/147 348/14.02 |
| 2011/0221874 A1 | 9/2011 | Oh |
| 2011/0221897 A1 | 9/2011 | Haddick et al. |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1 | 10/2011 | Fahrny et al. |
| 2011/0267422 A1 | 11/2011 | Garcia et al. |
| 2011/0267437 A1 | 11/2011 | Abeloe |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1 | 12/2011 | Shuster et al. |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050456 A1* | 3/2012 | Arnao .................. H04N 7/152 348/14.12 |
| 2012/0050458 A1* | 3/2012 | Mauchly ........... H04N 5/23238 348/14.16 |
| 2012/0050507 A1 | 3/2012 | Keys |
| 2012/0075407 A1 | 3/2012 | Wessling et al. |
| 2012/0092445 A1 | 4/2012 | McDowell et al. |
| 2012/0128322 A1 | 5/2012 | Shaffer et al. |
| 2012/0169730 A1 | 7/2012 | Inoue |
| 2012/0169838 A1 | 7/2012 | Sekine |
| 2012/0206558 A1 | 8/2012 | Setton et al. |
| 2012/0212509 A1* | 8/2012 | Benko ................. G03B 35/00 345/633 |
| 2012/0249719 A1 | 10/2012 | Lemmey et al. |
| 2012/0249741 A1 | 10/2012 | Maciocci et al. |
| 2012/0274731 A1 | 11/2012 | Shanmukhadas et al. |
| 2012/0327174 A1 | 12/2012 | Hines et al. |
| 2012/0327178 A1 | 12/2012 | Hines et al. |
| 2013/0070045 A1 | 3/2013 | Meek et al. |
| 2013/0120522 A1 | 5/2013 | Lian et al. |
| 2013/0271560 A1 | 10/2013 | Diao et al. |
| 2013/0307942 A1 | 11/2013 | Dini et al. |
| 2016/0142698 A1 | 5/2016 | Hines |
| 2016/0243442 A1 | 8/2016 | Friedman |
| 2016/0269722 A1 | 9/2016 | King et al. |
| 2016/0309117 A1 | 10/2016 | Hines et al. |
| 2016/0323546 A1 | 11/2016 | Hines |
| 2017/0150098 A1 | 5/2017 | Hines |
| 2017/0230727 A1 | 8/2017 | Meuninck |
| 2017/0318278 A1 | 11/2017 | Hines et al. |
| 2017/0353715 A1 | 12/2017 | King et al. |
| 2018/0068415 A1 | 3/2018 | Meuninck et al. |

* cited by examiner

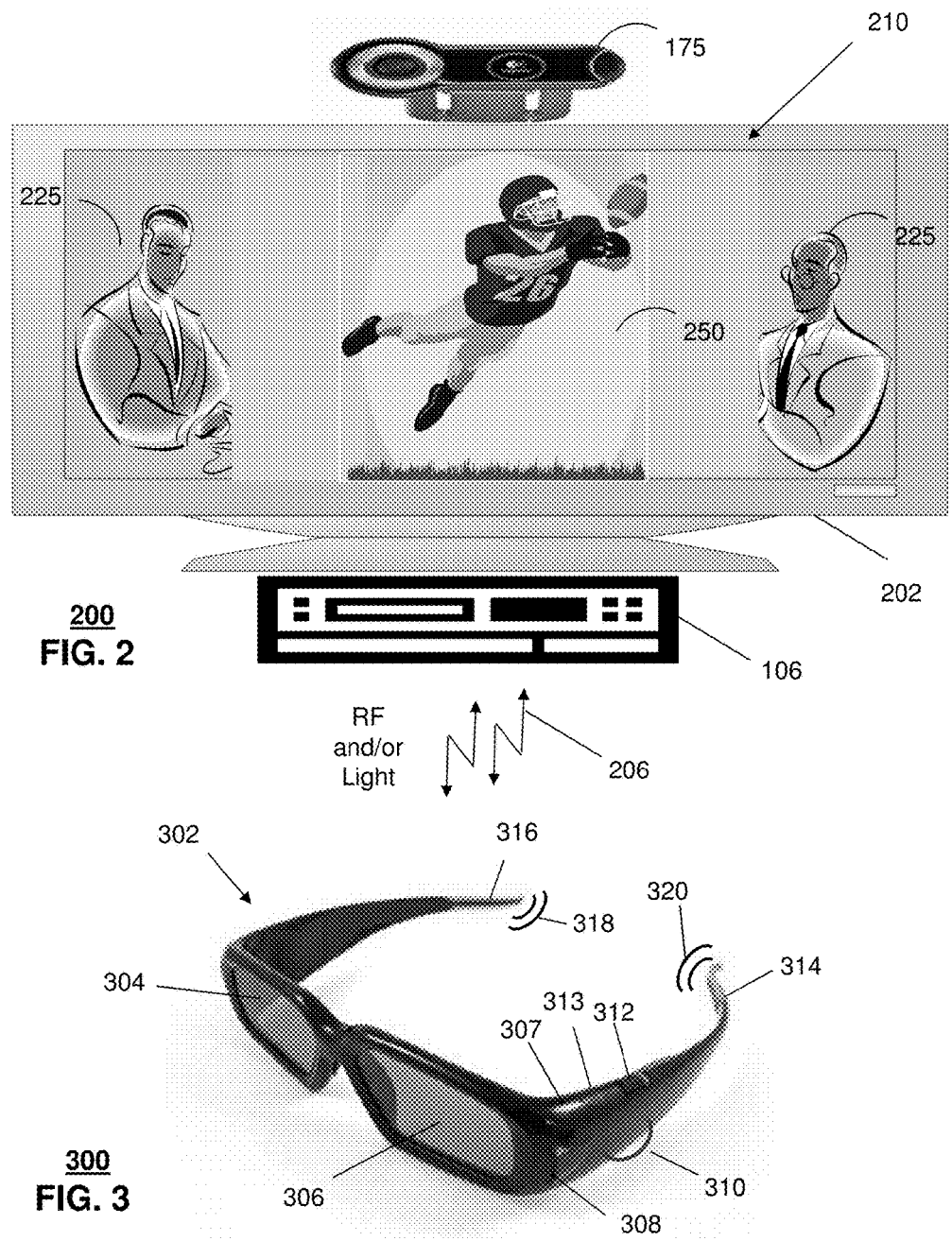

400

700

APPARATUS AND METHOD FOR PRESENTING MEDIA CONTENT WITH TELEPRESENCE

CROSS-REFERENCE TO RELATED APPLICATIONS

This application is a Continuation of and claims priority to U.S. patent application Ser. No. 13/168,539 filed Jun. 24, 2011. The contents of each of the foregoing is/are hereby incorporated by reference into this application as if set forth herein in full.

This application is related to co-pending U.S. application entitled "APPARATUS AND METHOD FOR PRESENTING THREE DIMENSIONAL OBJECTS WITH TELEPRESENCE" by Hines et al., 13/168,549 the disclosure of which is hereby incorporated by reference herein in its entirety.

FIELD OF THE DISCLOSURE

The present disclosure relates generally to media content communication and more specifically to an apparatus and method for presenting media content with telepresence.

BACKGROUND

Media consumption has become a multibillion dollar industry that continues to grow rapidly. High resolution displays such as high definition televisions and high resolution computer monitors can now present two-dimensional movies and games with three-dimensional perspective with improved clarity. Collectively, improvements in display, audio, and communication technologies are causing rapid demand for consumption of all types of media content. As consumption increases, the desire to share with others the consumed media content and information related to the media content also increases.

BRIEF DESCRIPTION OF THE DRAWINGS

FIG. 2 depicts an illustrative embodiment of a presentation device and media processor for presenting media content that can be used in the system of FIG. 1;

FIG. 3 depicts an illustrative embodiment of a viewing apparatus that can be used with the presentation device of FIG. 2;

DETAILED DESCRIPTION

Figure 1:
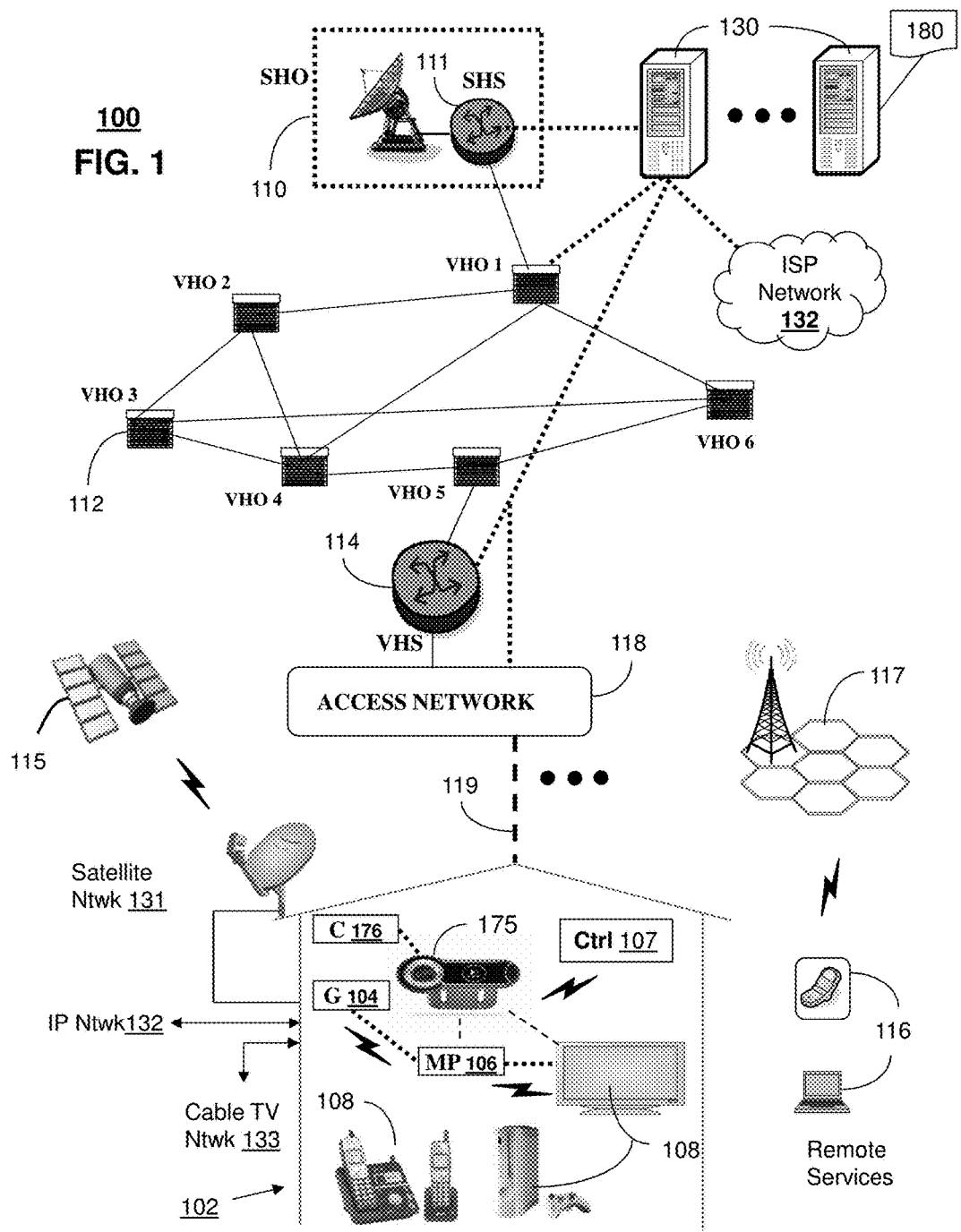
FIG. 1 depicts an illustrative embodiment of a communication system that provides media services with telepresence.

The present disclosure describes, among other things, illustrative embodiments of methods and devices for providing media content to a plurality of users, where the plurality of users are provided a telepresence of each other by establishing a communication session that simulates a co-location of each of the users at each of the user locations. In one or more embodiments, the media content and/or the images of the users, or a portion thereof, can be presented as three dimensional (3D) content to enhance the telepresence. In one or more embodiments, the 3D content can be generated by a remote server and/or can be generated by each media processor of the users, such as through use of a depth map. In one or more embodiments, 3D cameras and/or a plurality of two dimensional cameras at each user location can be utilized for generating 3D content. The media content can be selected in conjunction with a social network application associated with each of the users while control over presentation of the media content can remain with one of the users. In one or more embodiments, images of a user can be rotated or otherwise repositioned during presentation in response to detecting speech of the user to further enhance the telepresence by simulating the user facing another user to speak. In another embodiment, holographic content can be generated and/or presented at the user locations. Other embodiments are also contemplated.

One embodiment of the present disclosure can entail a server that includes a memory and a controller coupled to the memory. The controller can be adapted to obtain media content, receive first images that are captured by a first camera at a first location associated with a first user, and receive second images that are captured by a second camera at a second location associated with a second user. The controller can be adapted to provide the media content and second video content representative of the second images to a first processor for presentation at a first display device utilizing a first telepresence configuration that includes the second user. The first processor and the first display device are associated with the first user and located at the first location. The controller can be adapted to provide the media content and first video content representative of the first images to a second processor for presentation at a second display device utilizing a second telepresence configuration that includes the first user. The second processor and the second display device are associated with the second user and located at the second location. The providing of the first and second video content can be associated with a communication session between the first and second users. At least one of the first video content and the second video content can be adapted for presentation as 3D content by the corresponding first and second processors.

One embodiment of the present disclosure can entail a method that includes capturing first images using a first camera system at a first location associated with a first user. The method can include transmitting first video content representative of the first images over a network for presentation by a second media processor at a second location associated with a second user. The method can include receiving at a first media processor of the first location, media content and second video content representative of second images that are associated with the second user. The method can include presenting at a first display device of the first location, the media content and the second video content in a first telepresence configuration that simulates a presence of the second user at the first location. The media content and the first video content can be adapted for presentation by the second media processor in a second telepresence configuration that simulates a presence of the first user at the second location. At least one of the media content, the first video content and the second video content can be presented as 3D content.

One embodiment of the present disclosure can entail a non-transitory computer-readable storage medium that includes computer instructions. The instructions can enable obtaining media content at a server. The computer instructions can enable receiving at the server, first video content of a first user at a first location. The instructions can enable receiving at the server, second video content of a second user at a second location. The instructions can enable receiving at the server, third video content of a third user at a third location. The instructions can enable transmitting from the server, the media content and the second and third video content to a first media processor for presentation at a first display device that simulates the second and third users being present at the first location. The instructions can enable transmitting from the server, the media content and the first and third video content to a second media processor for presentation at a second display device that simulates the first and third users being present at the second location. The instructions can enable transmitting from the server, the media content and the first and second video content to a third media processor for presentation at a third display device that simulates the first and second users being present at the third location. The instructions can enable adjusting an orientation of images of the first user being presented at the second and third display devices in response to speech of the first user being detected. The adjusted orientation can be based on simulating the images of the first user speaking to the second and third users.

FIG. 1 depicts an illustrative embodiment of a first communication system 100 for delivering media content, which can include 3D media content. System 100 can present media services that generate telepresence configurations for different users at different locations, which simulate each of the users being present at the other user's location. The simulation can be accomplished in a number of different ways, such as by capturing images and/or modifying images of the users to simulate the users being at the location viewing media content, as opposed to contemporary video conferences that capture images of the user at a straight forward perspective. Other simulation techniques can be utilized in the media services, such as detecting speech of a target user and simulating the target user turning to speak.

The communication system 100 can represent an Internet Protocol Television (IPTV) broadcast media system although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102.

The gateway 104 can use common communication technology to distribute broadcast signals to media processors 106 such as computers, Set-Top Boxes (STBs) or gaming consoles which in turn present broadcast channels to display devices 108 such as television sets or holographic display devices, managed in some instances by a media controller 107 (such as an infrared or RF remote control, gaming controller, etc.).

The gateway 104, the media processors 106, and/or the display devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130, where a portion of these computing devices can operate as a web server for providing portal services over an Internet Service Provider (ISP) network 132 to media processors 106, wireline display devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, and so on).

A satellite broadcast television system can be used in conjunction with, or in place of, the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the display devices 108. The media processors 106 can be equipped with a broadband port to the IP network 132 to enable services such as VoD and EPG described above.

In yet another embodiment, an analog or digital broadcast distribution system such as cable TV system 133 can be used in place of or in conjunction with the IPTV media system described above. In this embodiment the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

System 100 can provide 3D content to the building 102 for presentation and/or can provide 2D content that can be rendered into 3D content by one or more client devices, such as the media processor 106 or the TV 108. The 3D image content can be based upon various 3D imaging techniques, including polarization, anaglyphics, active shuttering (such as alternate frame sequencing), autostereoscopy, and so forth. The present disclosure contemplates presentation of all or a portion of a display in 3D, including utilizing devices that do not require a wearable viewing apparatus (e.g., does not require active shuttering glasses).

In one embodiment, system 100 can include one or more image capturing devices 175 (e.g. a camera) that can capture 2D and/or 3D images of a user and/or other objects at the building 102. Other components can be utilized in combination with or in place of the camera 175, such as a scanner (e.g., a laser system that detects object circumference), distance detector, and so forth. In one embodiment, camera 175 can be a group of cameras, such as two or more cameras for providing different viewing angles and/or for providing a holographic image. In one embodiment, the camera 175 can capture images in 2D which are processed into 3D content, such as by media processor STB 106 and/or computing device 130. In one embodiment, depth maps can be utilized to generate 3D content from 2D images. In another embodiment, the camera 175 can be a stereoscopic camera that directly captures 3D images through use of multiple lenses. A collector 176 or other component can facilitate the processing and/or transmission of the captured images. The collector 176 can be a stand-alone device, such as in communication with the media processor 106 and/or the gateway 104 (e.g., wirelessly and/or hardwired) or can be integrated with another device, such as the media processor 106.

Computing device 130 can also include computer readable storage medium 180 having computer instructions for establishing a telepresence communication session between client devices. The computing device 130 can provide media content to a number of different users at different locations, such as a user at building 102, via the telepresence communication session. Computing device 130 can provide the media content in a telepresence configuration that simulates each of the other users (not shown) being present at building 102. For instance, the telepresence configuration can display the media content and further display each of the other users to simulate them watching the media content. In one embodiment, the particular telepresence configuration can be adjusted by one or more of the users based on user preferences, such as retrieved from a user profile or determined from monitored viewing behavior.

In one or more embodiments, the media content and/or the images of the users, or a portion thereof, can be presented as 3D content to enhance the telepresence. For example, the 3D content can be generated by computing device 130 and/or can be generated by media processor 106, such as through use of a depth map. System 100 can include other components to enhance the telepresence experience. For instance, lighting and audio components can be utilized to facilitate capturing the images and audio from a user. The lighting and/or audio components can be controlled by the media processor 106 and/or by the computing device 130. User preferences and/or monitored behavior can be utilized in controlling the lighting and/or audio components.

In one embodiment, the users can be part of a social network and the computing device 130 can be in communication with a social network application, such as for selecting the media content to be provided in the telepresence configuration. In one embodiment, one of the media processors 106 can maintain control over presentation of the media content in the telepresence configuration, such as pause, fast-forward, rewind, size, resolution, and so forth. In one embodiment, the telepresence configuration, including providing the media content and the video content of each of the users, can be performed without using the computing device 130 to generate the video content from captured images or to combine the media and video content. In one example, the telepresence configuration can be generated by the media processors and distributed through a peer-to-peer technique, where the media processors share the video content amongst themselves and obtain the media content from one of the media processors or from another source, such as media content being broadcast. In one embodiment, each of the media processors 106 of the different users can be in a master-slave arrangement to control presentation of the media content and facilitate generating the telepresence configuration.

System 100 enables video and/or audio content of the users to be provided to the other users in real-time to establish a communication session while simulating the co-location of the users and providing telepresence with the media content.

FIG. 2 depicts an illustrative embodiment of a presentation device 202 and the media processor 106 for presenting a telepresence configuration 210 that can include video content 225 which is captured images of one or more other users that are at different locations from where the presentation device 202 is located. The telepresence configuration 210 can also include the media content 250. The telepresence configuration 210 can simulate the other users being present at the location of the presentation device 202 through use of the video content 225. The simulation can be performed in a number of different ways, including presenting the other users in the images as if they were viewing the media content. The simulation can be facilitated by the positioning of the camera 175 and/or by post-capture processing, such as adjusting the video content 225 so that the other users appear as being rotated towards the media content 250. Other simulation effects can be utilized. For example, the images in the video content 225 can be re-sized, including based on the particular size of the presentation device 202, to further simulate the other users being present at the location of the presentation device 202. The media content 250 and/or video content 225 of one or more users can be provided for presentation in the telepresence configuration 210 in 3D.

One or both of the presentation device 202 and the media processor 106 can include the camera 175 that captures images of the user that are provided to the other users in their telepresence configuration 210. The camera 175 can capture 2D images and/or can capture 3D images. The camera 175 can be a group of cameras to capture multiple views, including views to construct a holographic image, such as of the user and/or of objects associated with the user. In one embodiment, the presentation device 202 can be a holographic display device that presents all or a portion of the telepresence configuration 210 as holographic content. The holographic content can allow a viewer's perspective on a depicted object to change as the viewer moves around the hologram content, just as it would if the object were real.

In the present illustration, the presentation device 202 is depicted as a television set. It will be appreciated that the presentation device 202 can represent a portable communication device such as a cellular phone, a PDA, a computer, or other computing device with the ability to display media content. The media processor 106 can be an STB, or some other computing device such as a cellular phone, computer, gaming console, or other device that can process and direct the presentation device 202 to present images associated with media content. It is further noted that the media processor 106 and the presentation device 202 can be an integral unit. For example, a computer or cellular phone having computing and display resources collectively can represent the combination of a presentation device 202 and media processor 106.

The media processor 106 can be adapted to communicate with accessories such as the viewing apparatus 300 of FIG. 3 by way of a wired or wireless interface, such as through RF and/or light waves 206. The communication can be one-way and/or two-way communication, such as providing the viewing apparatus 300 with a transceiver 302. A wired interface can represent a tethered connection from the viewing apparatus 300 to an interface of the media processor (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 300 is contemplated by the presented disclosure.

The viewing apparatus 300 can represent an apparatus for viewing two-dimensional and/or 3D stereoscopic images which can be still or moving images. The viewing apparatus 300 can be an active shutter viewing apparatus. In this embodiment, each lens has a liquid crystal layer which can be darkened or made to be transparent by the application of one or more bias voltages. Each lens 304, 306 can be independently controlled. Accordingly, the darkening of the lenses can alternate, or can be controlled to operate simultaneously.

Each viewing apparatus 300 can include various components associated with a communication device including a wireline and/or wireless transceiver 302 (herein transceiver 302), a user interface (UI), a power supply, a location detector, and a controller 307 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI can include a depressible or touch-sensitive keypad with a navigation mechanism such as a roller ball, joystick, mouse, or navigation disk for manipulating operations of the communication device 300. The keypad can be an integral part of a housing assembly of the apparatus 300 or an independent device operably coupled thereto by a tethered wireline interface (such as a USB cable) or a wireless interface supporting for example Bluetooth. The keypad can represent a numeric dialing keypad, commonly used by phones, and/or a Qwerty keypad with alphanumeric keys. The UI can further include a display such as monochrome or color LCD (Liquid Crystal Display), OLED (Organic Light Emitting Diode) or other suitable display technology for conveying images to an end user of the apparatus 300. In an embodiment where the display is touch-sensitive, a portion or all of the keypad 308 can be presented by way of the display.

The UI can also include an audio system 312 that utilizes common audio technology for conveying low volume audio (such as audio heard only in the proximity of a human ear) and high volume audio for hands free operation. The audio system 312 can further include a microphone for receiving audible signals of an end user. The audio system 312 can also be used for voice recognition applications. The UI can further include an image sensor such as a charged coupled device (CCD) camera for capturing still or moving images.

The power supply can utilize common power management technologies such as replaceable and rechargeable batteries, supply regulation technologies, and charging system technologies for supplying energy to the components of the apparatus 300 to facilitate long-range or short-range portable applications. The location detector can utilize common location technology such as a global positioning system (GPS) receiver for identifying a location of the communication device 300 based on signals generated by a constellation of GPS satellites, thereby facilitating common location services such as navigation.

The transceiver 302 can also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

In one embodiment, the viewing apparatus 300 can utilize a receiver portion of the transceiver 302 in the form of an infrared. Alternatively, the viewing apparatus 300 can function as a two-way communication device, in which case a full infrared transceiver could be utilize to exchange signals between the media processor 106 and the viewing apparatus 300.

The viewing apparatus 300 can utilize a controller 307 to control operations thereof, and a portable power supply (not shown). The viewing apparatus 300 can have portions of a UI. For example, the viewing apparatus 300 can have a multi-purpose button 312 which can function as a power on/off button and as a channel selection button. A power on/off feature can be implemented by a long-duration depression of button 312 which can toggle from an on state to an off state and vice-versa. Fast depressions of button 312 can be used for channel navigation. Alternatively, two buttons can be added to the viewing apparatus 300 for up/down channel selection, which operate independent of the on/off power button 312. In another embodiment, a thumbwheel can be used for scrolling between channels.

The viewing apparatus 300 can also include an audio system 313 with one or more speakers in the extensions of the housing assembly such as shown by references 314, 316 to produce localized audio 318, 320 near a user's ears. Different portions of the housing assembly can be used to produce mono, stereo, or surround sound effects. Ear cups (not shown) such as those used in headphones can be used by the viewing apparatus 300 (as an accessory or integral component) for a more direct and low-noise audio presentation technique. The volume of sound presented by the speakers 314, 316 can be controlled by a thumbwheel 310 (or up/down buttons—not shown).

It would be evident from the above descriptions that many embodiments of the viewing apparatus 300 are possible, all of which are contemplated by the present disclosure. In one embodiment, the viewing apparatus 300 can be utilized as part of the image capture process. For instance, the transceiver 302 can function to transmit a locator and/or calibration request that is wirelessly emitted for receipt by the camera(s) 175 or another processing device, such as the media processor 106. The emitted signal can be position information that is utilized to facilitate capturing images of the target, including adjusting the positioning and focus of the camera(s) 175 to capture the user and/or another object.

In one embodiment, the presentation device 202 can present holographic content that enables different perspectives of a user and/or object to be viewed depending on the position of the viewer. The holographic content can be all or a portion of the telepresence configuration 210, such as only the media content 250 or only one or more of the video content 225. As an example, the presentation device 202 can utilize active shuttering where different perspectives of an image are presented during different time slots which can be synchronized with the viewing apparatus 300. The particular perspective of an image can be viewed via the active shuttering of the viewing apparatus 300 based on the position of the viewer, such as detected from the viewing apparatus. An example of this is described in U.S. application Ser. No. 12/839,943 filed on Jul. 20, 2010, the disclosure of which is hereby incorporated by reference in its entirety. Other techniques and components are contemplated for presenting holographic content at the presentation device 202, including with or without a viewing apparatus 300.

In one embodiment, the images of the user in video content 225 can be modified, including change of clothing, environment and/or appearance. For example, the images of the other users can be presented but without the viewing apparatus 300 being worn. For instance, other images of the other users, such as in user profiles, can be utilized to modify the images to fill in pixels where the viewing apparatus 300 was removed. In another example, the modification of the images of the video content 225 can be based on the media content, such as the images of the other users being presented but wearing a cowboy hat where the media content is a cowboy movie. The modifications to the video content 225 can be based on a number of different factors, such as user preferences, and can be controlled by various entities, such as allowing a user to retain control over any modifications to the presentation of their own images and/or allowing a user to control any modification to the presentation of other users.

Figure 4:
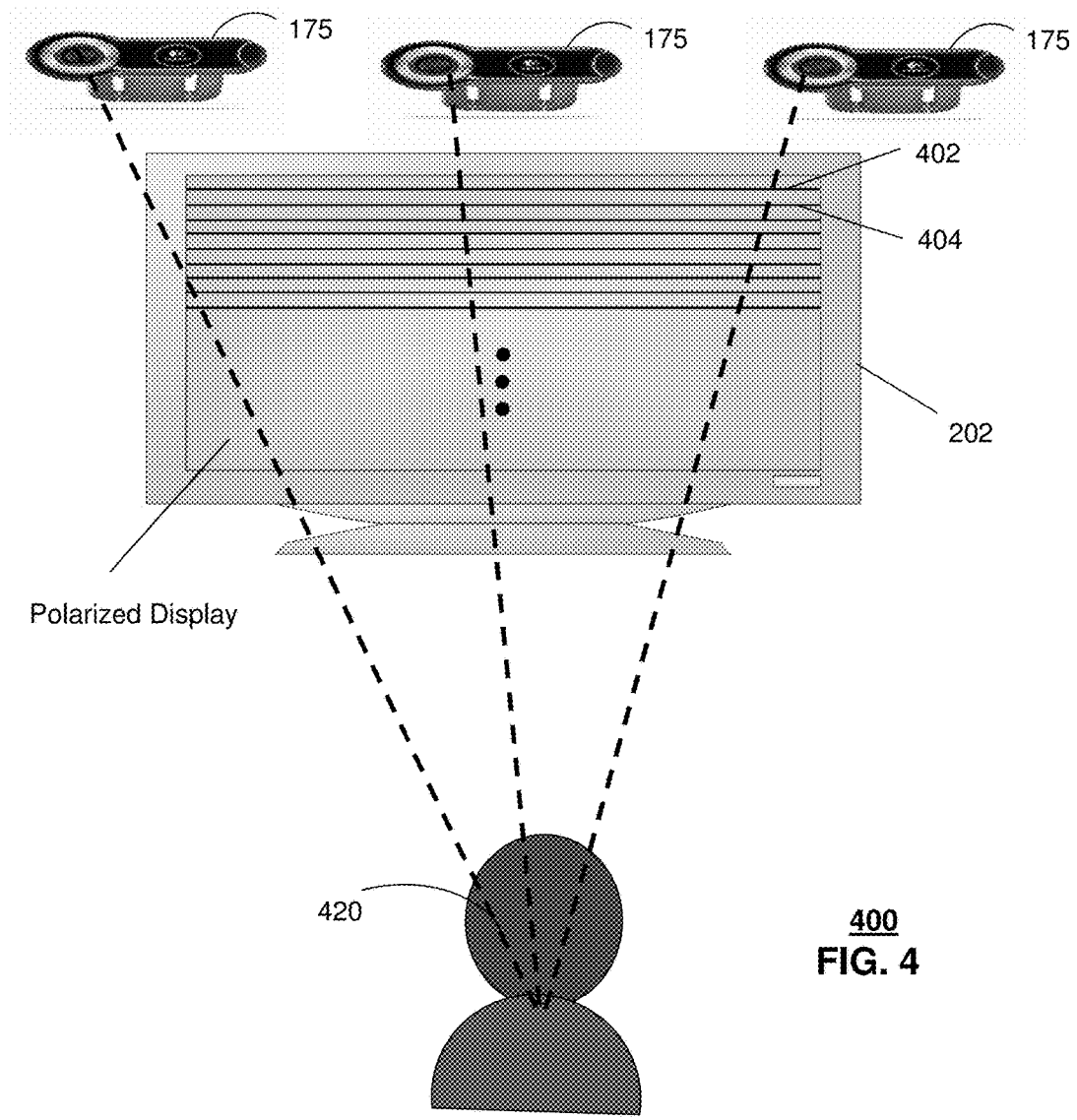
FIG. 4 depicts an illustrative embodiment of a presentation device with a polarized display that can be used in the system of FIG. 1.

FIG. 4 depicts an illustrative embodiment of a presentation device 402 with a polarized display. A display can be polarized with polarization filter technology so that alternative horizontal pixel rows can be made to have differing polarizations. For instance, odd horizontal pixels 402 can be polarized for viewing with one polarization filter, while even horizontal pixels 404 can be polarized for viewing with an alternative polarization filter. The viewing apparatus 300 previously described can be adapted to have one lens polarized for odd pixel rows, while the other lens is polarized for viewing even pixel rows. With polarized lenses, the viewing apparatus 300 can present a user a 3D stereoscopic image. The telepresence configuration 210 of FIG. 2 can be presented utilizing the presentation device 402.

System 400 illustrates use of multiple cameras 175 for capturing images of user 420 from different perspectives or views. The different perspective images can then be utilized for generating a 3D representation of the user 420. The particular number and positioning of the cameras 175 can vary. In one embodiment, one of the cameras 175 can be a depth or distance camera that is utilized for generating a depth map associated with the user 420 so that the depth map and images captured by the other cameras can be used in constructing the 3D representation of the user 420.

Figure 5:
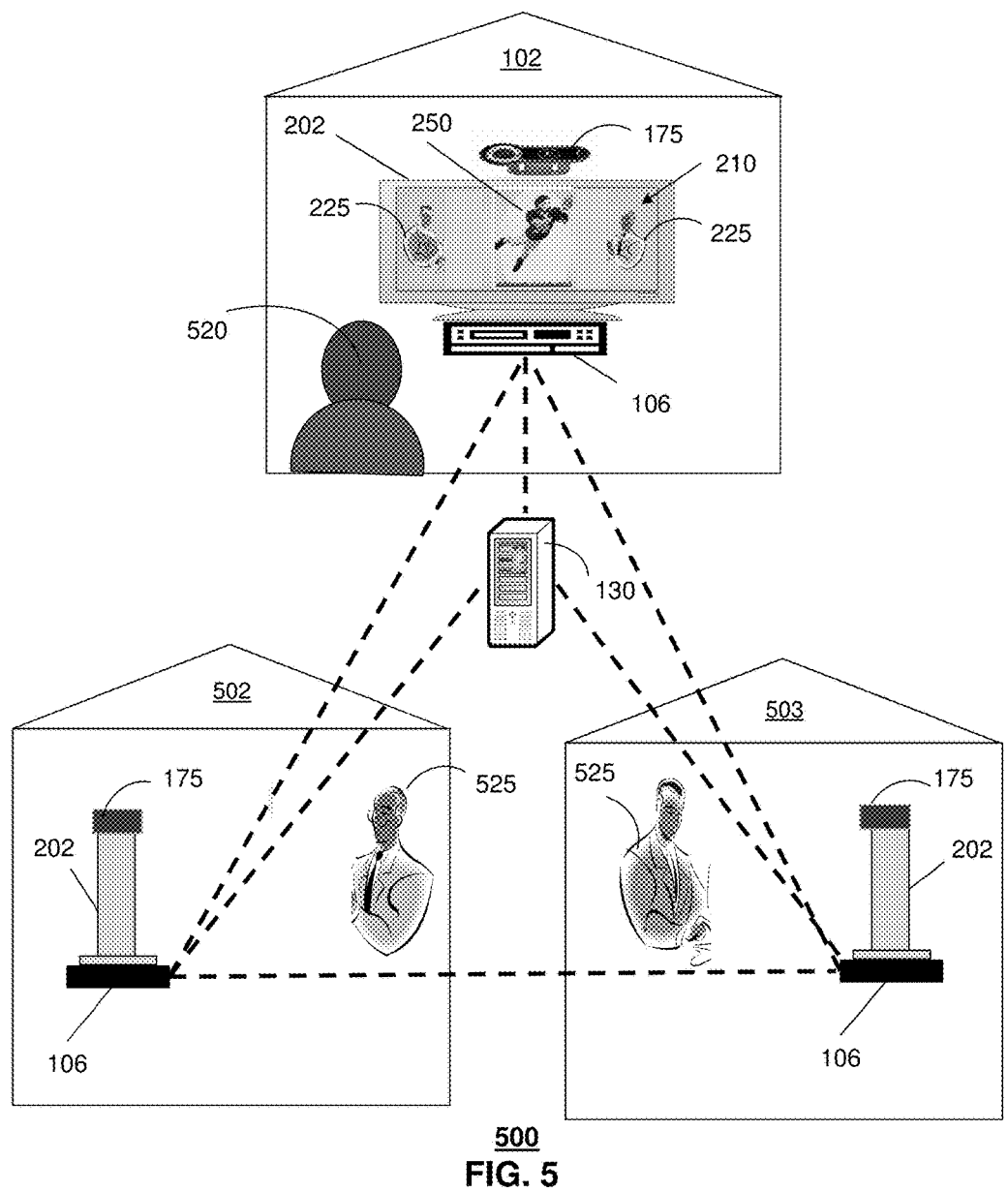
FIGS. 5 and 6 depict illustrative embodiments of communication systems that provide media services with telepresence.

FIG. 5 depicts an illustrative embodiment of a communication system 500 that can provide the telepresence configuration 210 to a plurality of locations 102, 502 and 503. While three locations are illustrated in system 500, the present disclosure contemplates two or more locations being utilized. The telepresence configuration 210 for each of the locations 102, 502 and 503 includes the media content 250 and includes video content 225 for the other users. For example, a user 520 at location 102 is provided with video content 225 that includes other users 525 at locations 502 and 503. The computing device 130 can be utilized to provide the telepresence configuration 210 to each of the locations 102, 502, 503, such as through receiving captured images of each of the users 520 and 525 and distributing the video content 225 and the media content 250 to each of the locations. As an example, each of the media processors 106 can then present the video content 225 and the media content 250, such as in the side-by-side window arrangement shown in FIG. 2. In one embodiment, the captured images and the media content 250 can be combined by the computing device 130 into single content that is provided to the locations 102, 502 and 503, such as through a multicast, without the need for further arranging the media and video content. In one embodiment, separate or a combined stream of the media content 250 and the video content(s) 225 can be provided to each media processor 106 for combining into the telepresence configuration 210.

In one embodiment, the media processor 106 can instruct the users 520 and 525 to sit or otherwise position themselves where they will be watching the telepresence configuration 210. A position of the user can then be determined for adjusting the camera 175. A distance to the viewer can be determined, such as through use of time-of-flight, stereo triangulation, sheet of light triangulation, structured light, interferometry, coded aperture, and so forth. Other components can also be utilized to facilitate the process, including a depth camera integrated with camera 175 or provided as a stand-alone component.

Figure 6:
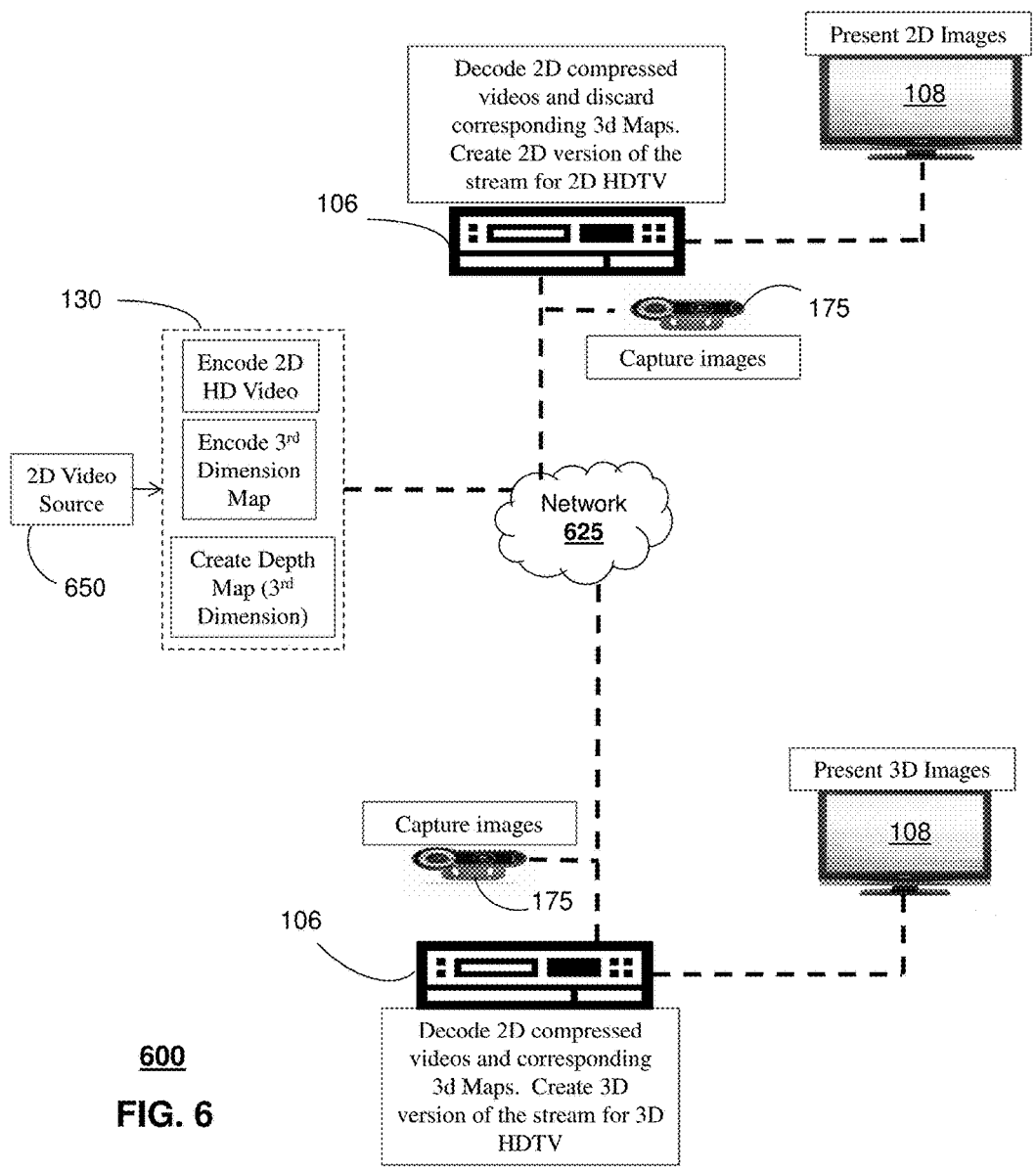

FIG. 6 depicts an illustrative embodiment of another communication system 600 that can present the telepresence configuration 210 at display devices 108 of different users at different locations via a telepresence communication session. System 600 can be overlaid or operably coupled with the devices and systems of FIGS. 1-5 to receive media content 250 and/or video content 225, which is presentable as 3D content. System 600 can include computing device 130 for receiving 2D media content from a media source 650 and for generating (or otherwise obtaining) a depth map associated with the media content, such as based on object segmentation. The computing device 130 can encode the media content and depth map (such as into a single video stream in H.264 format encapsulated in an MPEG-2 wrapper) and transmit the media content and depth map to one or more media processors 106, such as through broadcast, multicast and/or unicast utilizing network 625. In one embodiment, the computing device 130 can generate the depth map in real-time or near real-time upon receipt of the 2D media content, such as from a broadcast studio. The computing device 130 can also generate a depth map for video content that is captured by the cameras 175 in 2D.

System 600 includes media processors 106 which receive the video stream of the 2D media and video content and the corresponding depth maps. The media processors 106 can generate 3D content using the depth maps in real time upon receipt of the video stream. The media processors 106 can also detect the capability of display devices (such as through HDMI 1.4a) and can adjust the media content accordingly. For instance, if a display device 108 can only present 2D content, then the media processor 106 may discard the depth map and provide the 2D content to the display device. Otherwise, the media processor 106 can perform the real-time generation of the 3D content using the depth map and provide the content to the 3D capable display device 108. The conversion into 3D content from the depth map(s) can be based upon various imaging techniques and the 3D presentation in the telepresence configuration 210 can be based upon various formats including polarization, anaglyphics, active shuttering (such as alternate frame sequencing), autostereoscopy, and so forth.

In one embodiment, position information associated with one or more viewers can be utilized to adjust 3D media content, such as adjusting a convergence of the media content 250 and/or video content 225 based on a distance of the viewer(s) from the display device 108. Calibration can also be performed using a number of components and/or techniques, including a distance camera to measure distances and/or image camera 175 for capturing images of the viewers which can be used for interpolating distances.

System 600 has the flexibility to selectively provide 2D content and 3D content to different locations. System 600 further has the flexibility to selectively provide a combination of 2D and 3D content for presentation in the telepresence configuration 210 (FIG. 2). For example, a user may desire to watch the media content 250 in 3D while viewing the video content 225 in 2D. The selection of 2D or 3D presentation can be based on a number of factors, including device capability and type of content. The selection can be made by a number of different entities, including the users via the media processors 106 and/or by the service provider via computing device 130. The selection of 2D or 3D can also be made by one or more devices of system 600 without user intervention based on a number of factors, such as device capability, network status, viewing history, and so forth.

Figure 7:
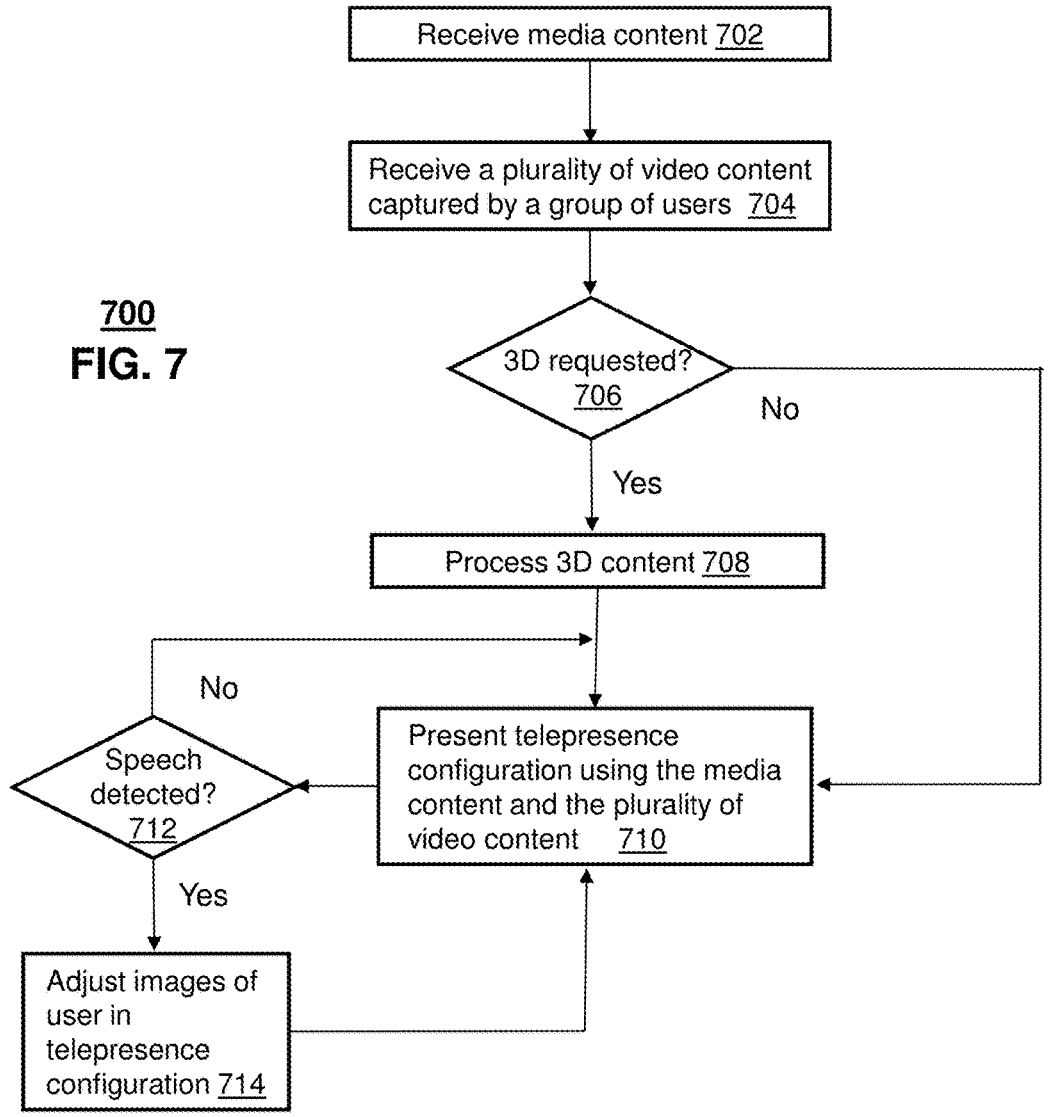
FIG. 7 depicts an illustrative embodiment of a method operating in portions of the devices and systems of FIGS. 1-6.

FIG. 7 depicts an illustrative embodiment of a method 700 operating in portions of the devices and systems described herein and/or illustrated in FIGS. 1-6. Method 700 can begin with step 702 in which media content is obtained, such as through transmission over a network from a media source. The media content can be various types from various sources. For example, the media content can be movies that are broadcast or accessed on demand. In one embodiment, the media content can be still images. In one embodiment, the media content can be images of an object that can be manipulated, such as presenting images of a car that can be rotated. The media content can be received as 2D content and converted to 3D content and/or can be received as 3D content. The media content can be received by the computing device 130 (e.g., a centralized distribution process) and/or received by one or more of the media processors 106 (e.g., a distributed or master-slave process). It should be understood that the present disclosure contemplates the media processor 106 being various types of devices, including personal computers, set top boxes, smart phones and so forth.

At step 704, video content can be received from a plurality of different media receivers 106 at different locations. The video content can be received as part of a communication session established between media processors 106 of each of the different users. Each of the video content can be received as 2D content and converted to 3D content and/or can be received as 3D content. Each of the video content can be received by the computing device 130 (e.g., a centralized distribution process) and/or received by one or more of the media processors 106 (e.g., a distributed or master-slave process). The video content can be captured by one or more cameras 175 at each location, where the cameras are 2D and/or 3D cameras. Other components can also be used to facilitate capturing the video content, including lighting components and/or audio components, which can be controlled locally and/or remotely (e.g., by the computing device 130 or a master media processor 106).

At step 706, it can be determined if 3D content has been requested or is otherwise desired. For instance, a user profile associated with each user at each location can be accessed by the computing device 130 and/or one or more of the media processors 106 to determine if 3D content is desired for the media content and/or video content. If 3D content is desired then at step 708 the content can be processed accordingly. For example, if the content received is in 3D format then a determination can be made if the format is compatible with the media processors 106 and adjusted accordingly. For instance, content can be adjusted to be compatible with a first media processor 106 and a copy of the content can be further adjusted to be compatible with a second media processor. If the content is in 2D format then the content can be converted to 3D format, such as through use of a depth map or using other techniques. At step 710, the media content and the video content can be presented at each display device of each location in a telepresence configuration, such as configuration 210 of FIG. 2. The telepresence configuration can simulate each of the users being co-located at each location. In one embodiment, the telepresence configurations can be adjustable, such as by the user selecting the configuration. The adjustments to the telepresence configuration can include positioning of the video content, size, resolution, and so forth.

In one embodiment at step 712, the computing device 130 and/or the media processor 106 can monitor to detect speech of a user at one of the locations. If speech is detected from a target user, then at step 714 the video content can be adjusted (e.g., by the computing device 130 and/or the media processor 106) to further simulate the target user speaking to the other users. This simulation can include depicting the target user or a portion thereof (e.g., the user's head) turning to face the viewer of the display device to speak with them. In one embodiment, the telepresence configuration can provide images of the rear of the other user's head'0s as if they were watching the media content and then present the face of the target user when the target user is speaking. In one embodiment, images of a front of a user's head can be used to generate video content depicting the back of the user's head, such as through determining shape, circumference, hair color and so forth.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 700.

In one embodiment, the device(s) that perform the functions described herein can be selected based on capability. For example, if all media processors 106 have the ability to generate 3D video content then a distributed process can be utilized that does not utilize the computing device 130 for generating 3D content. As another example, if only a portion of the media processors 106 have the ability to generate 3D content then a master-slave arrangement can be established between the media processors 106 without the need to utilize the computing device 130 to generate the 3D content. As another example, if none of the media processors 106 have the ability to generate 3D content then the computing device 130 can be utilized for generating 3D content. Similarly, 2D images captured by a 2D camera can be transmitted to a device capable of generating 3D video content, such as the computing device 130 and/or another media processor 106. In one embodiment, the selection of the device(s) can be based on other factors, including processing resources, workload, type of content and so forth. For example, if only one media processor 106 has the capability to generate 3D content then the computing device 130 may be utilized along with the select media processor for generating the 3D content.

In one embodiment, the selection of the media content can be performed in conjunction with a negotiation process amongst at least a portion of the users that are intended to receive the telepresence configuration. For example, the users can vote on the media content to be presented. In another embodiment, priority can be provided to particular users for the negotiating process, such as priority based on device capability. As another example, past voting history can be used as a factor in the selection of the media content, such as weighting votes more heavily when the user has been unsuccessful in voting to select media content in the past.

In one embodiment, the selection of the media content can be based on factors associated with one of the users. For example, the other users may desire to wish happy birthday to a target user. A telepresence session can be established with the target users and the other users in which the media content is a particular singer singing a birthday song to the target user. The selection of the singer can be done based on a preference of the target user, including based on monitored consumption history by the target user of songs.

In one embodiment, the providing of the telepresence configuration can be done in conjunction with a social network application. For example, each of the users can be members of the social network and the establishing of the communication session between the different users can be initiated based on selections made from the social network application.

In one embodiment, the presentation of the telepresence configuration by a media processor 106 can be done at multiple display devices. For example, in a system that has three display devices positioned adjacent to each other, the media processor 106 can provide a middle display device with the media content for presentation while providing the end display devices with each of the video content from the other users to simulate the other users being co-located at the location of the media processor 106.

In one embodiment, a plurality of formats can be generated for the media content 250. The different formats can be based on the capabilities of the media processors 106 and/or the display devices 108. For instance, holographic content may be generated for the media processor 106 if it is determined that the presentation device 202 at location 102 is a holographic display device or otherwise has the ability to present holographic images, while 3D content based on active shuttering can be generated for the media processor 106 of location 502 if it is determined that capabilities at that location warrant this format. In one embodiment, the selection and generation of the format of the object content can be based on capability determinations being made by the devices of system 500, such as the computing device 130 querying the local devices for display capabilities and/or accessing user profiles or past history information to make the determination. In one embodiment, each of the various formats can be generated without regard to device capabilities and a selection can then be made of the corresponding format to be transmitted.

Other suitable modifications can be applied to the present disclosure without departing from the scope of the claims below. Accordingly, the reader is directed to the claims section for a fuller understanding of the breadth and scope of the present disclosure.

Figure 8:
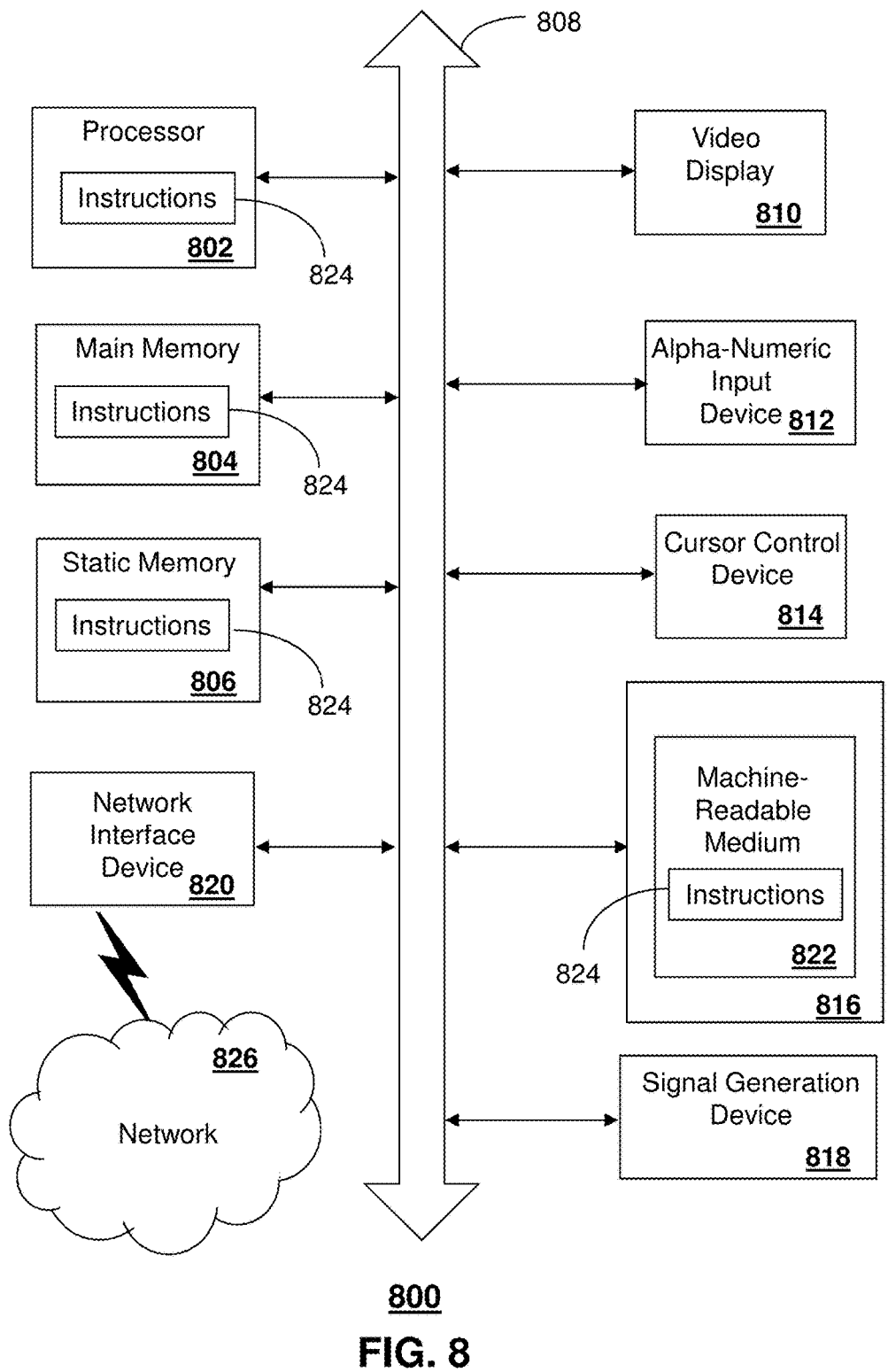
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. The devices of computer system 800 can be found in the previously shown figures, such as camera 175, media processor 106, TV 202 and so forth.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media. The instructions 824 can include one or more of the steps described above, including calibration steps, such as determining or interpolating viewer distance, determining convergence from viewer distance, and so forth.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP), as well as the examples for calibration, distance determination, communication protocols, and so forth, represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
   a memory for storing executable instructions; and
   a processing system comprising a processor coupled to the memory, wherein the executable instructions, when executed by the processing system, facilitate performance of operations comprising:
   receiving a plurality of first images from a first location associated with a first user;
   generating a holographic image of the first user from the plurality of first images of the first user;
   receiving second images from a second location associated with a second user;
   detecting speech of the first user;
   responsive to the detecting of the speech of the first user:
      modifying the holographic image of the first user to generate a modified holographic image to simulate the first user turning to speak to the second user; and
      modifying the second images of the second user to generate modified second images to simulate the second user turning to listen to the first user;
   providing first video content representative of the modified holographic image to a second device for presentation at a second display device, wherein the second device and the second display device are associated with the second user and located at the second location; and
   providing second video content representative of the modified second images to a first device for presentation at a first display device, wherein the first device and the first display device are associated with the first user and located at the first location.

2. The server of claim 1, wherein the first images are captured by a first camera of the first device.

3. The server of claim 1, wherein the first device receives location information from a first viewing apparatus of the first user, and wherein the first device adjusts a first camera responsive to the location information.

4. The server of claim 1, wherein the second images are captured by a second camera of a first device.

5. The server of claim 1, wherein the providing of the first video content and the second video content is associated with a communication session between the first user and the second user.

6. The server of claim 1, wherein one of the first video content, the second video content, or a combination thereof is adapted for presentation as three dimensional content by the first device and the second device.

7. The server of claim 1, wherein one of the first user, the second user, or a combination thereof, control how the first images, the second images, or any combination thereof, are modified.

8. The server of claim 1, wherein the first device is included in a first set top box.

9. The server of claim 1, wherein the operations further comprise:
accessing a user profile associated with the first user; and
determining whether the first video content is to be presented as two dimensional or three dimensional content based on a preference of the user profile.

10. The server of claim 1, wherein the operations further comprise:
obtaining media content; and
providing the media content to the first device with the second video content, the second device with the first video content, or any combination thereof.

11. The server of claim 10, wherein the first images are modified to generate the first video based on the media content, the second images are modified to generate the second video based on the media content, or any combination thereof.

12. The server of claim 10, wherein the operations further comprise obtaining depth maps corresponding to each of the media content, the first images and the second images for converting the media content, the first images and the second images into three dimensional content.

13. The server of claim 10, wherein the media content is adapted for presentation as three dimensional content.

14. The server of claim 10, wherein the operations further comprise providing the first device or the second device with control over presentation of the media content at the first device, the second device, or a combination thereof.

15. A method comprising:
obtaining, by a processing system comprising a processor, a plurality of first images that are captured at a first location associated with a first user;
generating, by the processing system, a holographic image of the first user from the plurality of first images;
capturing, by the processing system, an audio signal at the first location associated with a first user;
transmitting, to a server by the processing system, the audio signal and the holographic image;
receiving, by the processing system, second video content representative of second images that are associated with a second user at a second location, wherein, responsive to determining that the audio signal includes speech of the first user, the holographic image is modified via the server to simulate the first user turning to speak to a second user and the second images are modified via the server to simulate the second user turning to listen to the first user;
presenting, by the processing system, at a first display device of the first location, the second images as modified to simulate the first user turning to speak; and
presenting, by the processing system, at a second display device of the second location the holographic image as modified to simulate the first user turning to listen.

16. The method of claim 15, wherein the first images are captured by a first camera of the first device.

17. The method of claim 15, further comprising:
receiving, by the processing system, media content; and
presenting, by the processing system, the media content with the second images.

18. The method of claim 17, wherein the first images are modified to generate the first video based on the media content, the second images are modified to generate the second video based on the media content, or any combination thereof.

19. A non-transitory machine-readable storage medium, comprising executable instructions that, when executed by a processing system including a processor, facilitate performance of operations, comprising:
detecting speech of a first user at a first location;
receiving a plurality of first images at a first location associated with a first user;
generating a holographic image of the first user from the plurality of first images of the first user;
responsive to detecting the speech of the first user, modifying the holographic image of the first user to simulate the first user turning to speak to a second user; and
providing first video content representative of the plurality of first images to a second device for presentation at a second display device, wherein the second device and the second display device are associated with a second user that is located at a second location.

20. The non-transitory machine-readable storage medium of claim 19, wherein the operations further comprise:
receiving second images at the second location associated with the second user;
modifying the second images of the second user to simulate the second user turning to listen to the first user; and
providing second video content representative of the second images to a first device for presentation at a first display device, wherein the first device and the first display device are associated with the first user and located at the first location.

* * * * *